(12) United States Patent
Pertijs et al.

(10) Patent No.: US 7,674,035 B2
(45) Date of Patent: Mar. 9, 2010

(54) DIGITAL TEMPERATURE SENSORS AND CALIBRATION THEREOF

(75) Inventors: Michiel Pertijs, Delft (NL); Johan Huijsing, Schipluiden (NL)

(73) Assignee: NXP B.V., Eindhoven (NL)

( * ) Notice: Subject to any disclaimer, the term of this patent is extended or adjusted under 35 U.S.C. 154(b) by 118 days.

(21) Appl. No.: 11/575,303

(22) PCT Filed: Sep. 13, 2005

(86) PCT No.: PCT/IB2005/052990

§ 371 (c)(1),
(2), (4) Date: Mar. 14, 2007

(87) PCT Pub. No.: WO2006/030374

PCT Pub. Date: Mar. 23, 2006

(65) Prior Publication Data

US 2008/0069176 A1    Mar. 20, 2008

(30) Foreign Application Priority Data

Sep. 15, 2004  (GB) ................................. 0420486.3
Apr. 19, 2005  (GB) ................................. 0507820.9

(51) Int. Cl.
*G01K 15/00*  (2006.01)
*G01K 7/00*   (2006.01)

(52) U.S. Cl. ............................ 374/1; 374/170; 374/172

(58) Field of Classification Search ..................... 374/1, 374/170, 172
See application file for complete search history.

(56) References Cited

U.S. PATENT DOCUMENTS 6,888,397 B2 *  5/2005  Tsuchiya ..................... 327/512
6,921,198 B2 *  7/2005  Gruszecki et al. ........... 374/168

OTHER PUBLICATIONS

G.C.M. Meijer et al: "Non-Idealities of Temperature Sensors Using Substrate PNP Transistors"; Proc. IEEE Sensors 2002; Orlando FL USA; Jun. 12-14, 2002.

* cited by examiner

*Primary Examiner*—Lisa M Caputo
*Assistant Examiner*—Mirellys Jagan

(57) ABSTRACT

A method for calibrating a digital temperature sensor circuit, the circuit comprising an analogue temperature sensing means, an internal reference voltage source and an analogue-to-digital converter (ADC). The ADC is arranged to receive respective signals from the analogue temperature sensing means and the reference voltage source and output a digital signal indicative of the ambient temperature. The method comprises the steps of determining the value of the internal reference voltage outputted by the reference voltage source, comparing it with the desired reference voltage value, and adjusting the reference voltage source in response to the result of the comparison step. Such an electrical voltage mode calibration can significantly reduce production costs, as it can be performed much faster than a traditional thermal calibration. The method can be applied to a sensor that produces a PTAT voltage that has to be compared to a temperature-independent bandgap reference voltage.

5 Claims, 1 Drawing Sheet

DIGITAL TEMPERATURE SENSORS AND CALIBRATION THEREOF

The present invention relates to digital temperature sensors and particularly to improved methods of calibration thereof. Such sensors are often used as integrated temperature sensor components, in desktop and server computer applications, for example.

FIG. 1 shows a block diagram of a known "smart" temperature sensor. It contains an analogue temperature sensor, which produces a voltage $V_{PTAT}$ that is accurately proportional to absolute temperature (PTAT). To produce a digital output $AD_{OUT}$, an analogue-to-digital converter (ADC) compares this PTAT voltage with a temperature-independent bandgap reference voltage $V_{REF}$:

$$AD_{OUT} = \frac{V_{PTAT}}{V_{REF}} \quad (1)$$

Due to manufacturing tolerances (for example, spread in the parameters of the IC process, packaging shifts), the initial inaccuracy of such a temperature sensor is typically ±2.0° C. at room temperature. With proper circuit design, this inaccuracy mainly results from spread of the absolute value of the base-emitter voltage of the bipolar transistors used in the bandgap reference.

No circuit techniques are known to the inventors that can reduce this spread. Therefore, the inaccuracy can only be reduced by reducing the process tolerance on the base-emitter voltage, or by trimming the sensor. The first option is usually not acceptable if the sensor is to be produced in a standard low cost IC process. Therefore, most smart temperature sensors are trimmed. In a trimming process, the temperature error of the sensor is determined at one or more temperatures (the calibration step), after which the circuit is adjusted to nullify the error (the trimming step). The trimming step consists of a permanent modification of the circuit, either in the analogue or the digital domain, by for instance laser trimming, zener zapping or by changing a value stored in PROM.

The temperature error of the sensor is determined by comparing a reading of the sensor with a reading of a reference thermometer of known accuracy that has the same temperature as the sensor. This requires a thermally stable production environment. The comparison can be performed at wafer-level, in which case the time required to thermally stabilize the setup is shared by many sensors. The subsequent dicing and packaging will however result in shifts in the temperature error that are not compensated for. Therefore, individual calibration after packaging is desired for inaccuracies below ±0.5° C. With present thermal calibration techniques, the calibration is a substantial cost-limiting factor in the production process.

According to one aspect, the present invention provides a method for calibrating a digital temperature sensor circuit, the circuit comprising an analogue temperature sensing means, an internal reference voltage source and an analogue-to-digital converter (ADC) arranged to receive respective signals from the analogue temperature sensing means and the reference voltage source and output a digital signal indicative of the ambient temperature, the method comprising the steps of determining the value of the internal reference voltage outputted by the reference voltage source, comparing it with the desired reference voltage value, and adjusting the reference voltage source in response to the result of the comparison step.

The circuit may be arranged to enable the internal reference voltage to be measured directly therefrom, and so its value may be determined by direct measurement. This may be facilitated by including a suitable driver circuit, for example.

In another embodiment, the circuit is arranged to enable the output voltage of the analogue temperature sensing means to be measured directly. Thus, the internal reference voltage value may be determined from this output and the output signal from the ADC. Again, a suitable driver circuit may be used to enable this measurement to be taken directly.

In a further variation, the output signal from the internal reference voltage source to the ADC is replaced by an external reference voltage signal, the internal reference voltage value being determined using the ADC output signal values generated in response to the internal and external reference voltages, respectively.

Furthermore, the analogue temperature sensing means output signal may be replaced by a known external voltage, enabling the value of the internal reference voltage to be determined using the ADC output signal generated in response thereto.

According to a further aspect, the present invention provides a digital temperature sensor comprising an analogue temperature sensing means, an internal reference voltage source and an ADC arranged to receive respective signals from the analogue temperature sensing means and the reference voltage source and output a digital signal indicative of the ambient temperature, the internal reference voltage source being adjustable to alter the value of the reference voltage outputted thereby, and the circuit being arranged to receive an external reference voltage signal and to input this signal into the ADC in place of the internal reference voltage signal or the analogue temperature sensing means signal, so that the value of the internal reference voltage can be determined and the internal reference voltage signal adjusted as appropriate.

This invention uses the fact that, with proper circuit design, the initial accuracy of the on-chip analogue temperature sensor (PTAT source) is sufficient for most applications. Therefore, only the error of the on-chip voltage reference needs to be measured and compensated for. Such an electrical voltage mode calibration can significantly reduce production costs, as it can be performed much faster than a traditional thermal calibration.

Furthermore, it can be carried out after a circuit has been packaged, avoiding any perturbation caused thereby, and may not require any additional device pins.

With proper circuit design, a PTAT source with an initial inaccuracy of ±0.1° C. in the range of −50° C. to 125° C. can be made (see M. A. P. Pertijs, G. C. M. Meijer, J. H. Huijsing, "Non-Idealities of Temperature Sensors using Substrate PNP Transistors," Proc. IEEE Sensors 2002, Orlando, Fla., USA, Jun. 12-14, 2002, the contents of which are incorporated herein by reference). The inventors have realised that, as the contribution of the ADC to the inaccuracy of a sensor can be made negligible, a temperature sensor then only needs to be trimmed because of the high initial inaccuracy of the bandgap reference. Therefore, the calibration can be limited to the bandgap reference: only the error in the bandgap reference voltage with respect to an external voltage reference has to be determined, rather than the temperature error of the complete sensor.

A known temperature sensor and embodiments of the invention are described herein with reference to the accompanying drawings, wherein:

FIG. 2 shows four ways of measuring the bandgap reference voltage $V_{REF}$:

1. Directly, by outputting $V_{REF}$
2. Indirectly, by outputting $V_{PTAT}$ and $AD_{OUT}$ and computing $V_{REF}$ from equation (1).
3. Indirectly, by inputting an external reference voltage $V_{REFext}$ and doing two subsequent analogue-to-digital conversions: one using the internal and one using the external reference:

$$AD_{OUT1} = \frac{V_{PTAT}}{V_{REF}}, AD_{OUT2} = \frac{V_{PTAT}}{V_{REFext}} \Rightarrow V_{REF} = \frac{AD_{OUT2}}{AD_{OUT1}} V_{REFext} \quad (2)$$

Indirectly, by inputting an external signal voltage $V_{SIGext}$:

$$AD_{OUT} = \frac{V_{SIGext}}{V_{REF}} \Rightarrow V_{REF} \frac{V_{SIGext}}{AD_{OUT}} \quad (3)$$

In any of these cases, the value found for $V_{REF}$ is compared with an accurate external reference voltage to determine the error with respect to the desired value. Since the reference is essentially temperature-independent, the temperature of the sensor during the measurement is not critical.

The type of measurement is a voltage measurement, rather than a temperature measurement, which is more compatible with an industrial test environment and can be performed faster and more reliably.

Based on the error found, the bandgap reference circuit is trimmed by adding or subtracting an appropriate PTAT term. Since the error of a bandgap reference voltage tends to be PTAT, this ensures that the trimming is effective over a wide temperature range, even if the error is measured only at one temperature.

It will be appreciated that the overall accuracy after calibration and trimming using the described technique is determined by several factors:

the initial accuracy of the PTAT source,
the accuracy of the measurement of $V_{REF}$,
the resolution of the trimming of the base-emitter voltage,
the reproducability of the higher-order temperature dependency of the base-emitter voltage.

An accuracy of ±0.3° C. in the range of −50° C. to 125° C. may be obtainable with a single calibration at room temperature, providing that spread on the higher-order temperature dependency of the base-emitter voltage is small.

Of the above mentioned ways of measuring $V_{REF}$, options 3 and 4 are particularly beneficial as they imply that an accurate external voltage is input to the chip, rather than that an internal voltage is taken "off-chip", which would require an accurate "on-chip" driver.

Figure 1:
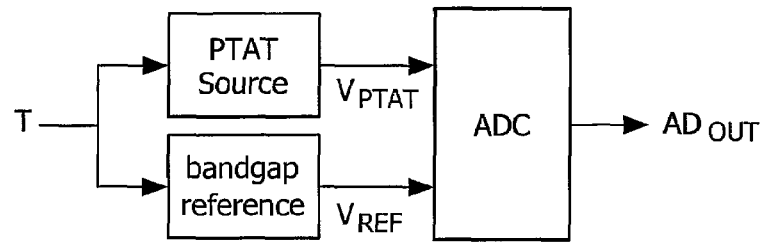
FIG. 1 shows a block diagram of a known temperature sensor.
Figure 2:
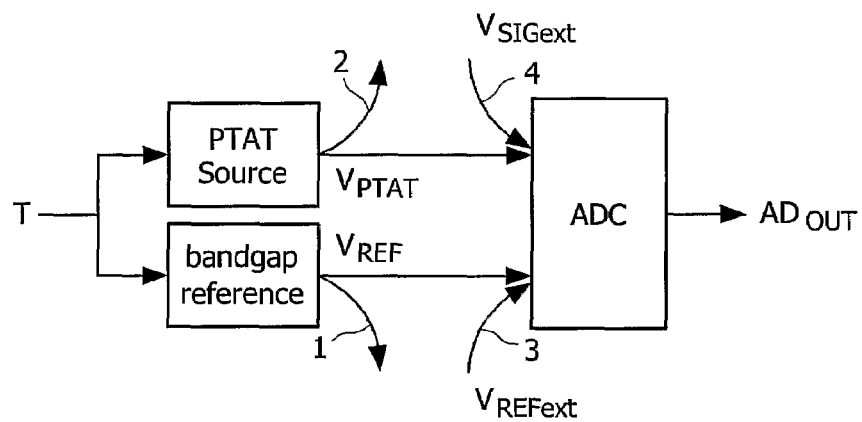
FIG. 2 shows the diagram of FIG. 1, amended to illustrate calibration techniques of embodiments of the invention.
Figure 3:
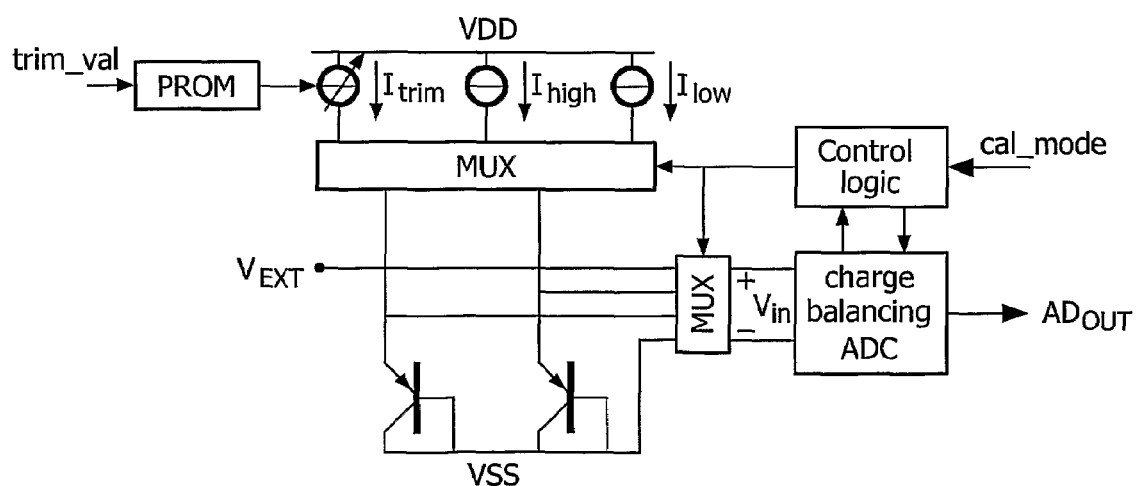
FIG. 3 shows a digital temperature circuit according to an embodiment of the invention.

FIG. 3 shows a schematic diagram of a temperature sensor that can be calibrated according to the invention. This implementation does not precisely correspond to either option 3 or 4, but essentially employs the same principle: a well-defined external voltage $V_{EXT}$ is applied to the chip during calibration to measure the deviation of the on-chip bandgap reference.

The error in the bandgap reference voltage is measured indirectly and their voltage is subsequently adjusted to its nominal value.

The core of the temperature sensor of FIG. 3 is formed by two substrate PNP transistors (in a CMOS process), which are biased using a set of three current sources: $I_{high}$ and $I_{low}$, which have a well-defined (possibly dynamically matched) ratio m (i.e. $I_{high}$=m $I_{low}$); and $I_{trim}$, the value of which can be digitally adjusted by changing trim_val in PROM.

Using two multiplexers, the input $V_{in}$ of a charge-balancing ADC (e.g. a sigma-delta ADC) can be one of the following voltages:

$\Delta V_{BE}$=$V_{BE}(I_{high})$−$V_{BE}(I_{low})$, which is difference between the base-emitter voltages of the two PNP transistors, and is proportional to absolute temperature (PTAT), $V_{BE}(I_{trim})$, which is the absolute base-emitter voltage of either PNP transistors, $V_{EXT}$, which is the well-defined external voltage.

Calibration of the sensor of FIG. 3 consists of two steps. First, a normal analogue-to-digital conversion is performed (cal_mode=0), during which the charge balancing ADC produces an untrimmed temperature reading:

$$AD_{OUT1} = \frac{\alpha \Delta V_{BE}}{V_{BE}(I_{trim}) + \alpha \Delta V_{BE}} = \frac{V_{PTAT}}{V_{REF}}, \quad (4)$$

where the factor $\alpha$ is an accurate ratio set internally in the ADC (e.g. by dynamically matched sampling capacitors).

After that, the external voltage $V_{EXT}$ takes the place of $V_{BE}$(cal_mode=1), and the ADC produces $$AD_{OUT2} = \frac{\alpha \Delta V_{BE}}{V_{EXT} + \alpha \Delta V_{BE}}. \quad (5)$$

From $AD_{OUT1}$, $AD_{OUT2}$ and $V_{EXT}$ we can calculate $V_{REF}$. From the deviation of $V_{REF}$ from the nominal value we can then calculate how much $I_{trim}$ has to be adjusted, i.e. which trim_val has to be programmed in PROM. During subsequent conversions, cal_mode will always be 0, and the ADC will produce accurate temperature readings.

This calibration technique may only require a little more circuitry than a 'traditionally' calibrated sensor: the multiplexers and control logic may be more complicated. A pin is required to which the external voltage can be applied to the circuit. A digital pin for example the pin used for address selection or a bus interface) may be reused for this purpose.

The trim value, to be stored in PROM, can be communicated to the chip using a bus interface, which is also used for reading out the sensor during normal operation.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this Application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new claims may be formulated to such features and/or combinations of such features during the prosecution of the present Application or of any further Application derived therefrom.

The invention claimed is:

1. A method for calibrating a digital temperature sensor circuit, the circuit comprising an analogue temperature sensing means, an internal reference voltage source and an analogue-to-digital converter (ADC) arranged to receive respective signals from the analogue temperature sensing means and the reference voltage source and output a digital signal indicative of the ambient temperature, the method comprising the steps of determining the value of the internal reference voltage outputted by the reference voltage source, comparing it with a desired reference voltage value, and adjusting the reference voltage source in response to the result of the comparison step;

wherein the circuit is arranged so that the output voltage of the analogue temperature sensing means is directly measurable, the step of determining the value of the internal reference voltage comprising directly measuring the output voltage of the analogue temperature sensing means and the output signal of the ADC and determining the value of the internal reference voltage therefrom.

2. A method of claim 1 wherein the circuit is arranged so that the internal reference voltage is directly measurable, the step of determining the value of the internal reference voltage comprising directly taking a measurement thereof.

3. A digital temperature sensor circuit comprising an analogue temperature sensing means, an internal reference voltage source and an ADC arranged to receive respective signals from the analogue temperature sensing means and the reference voltage source and output a digital signal indicative of the ambient temperature, the internal reference voltage source being adjustable to alter the value of the reference voltage outputted thereby, and the circuit being arranged to receive an external reference voltage signal and to input this signal into the ADC in place of the internal reference voltage source or the analogue temperature sensing means signal, so that the value of the internal reference voltage can be determined and the internal reference voltage source adjusted as appropriate.

4. A method for calibrating a digital temperature sensor circuit, the circuit comprising an analogue temperature sensing means, an internal reference voltage source and an analogue-to-digital converter (ADC) arranged to receive respective signals from the analogue temperature sensing means and the reference voltage source and output a digital signal indicative of the ambient temperature, the method comprising the steps of determining the value of the internal reference voltage outputted by the reference voltage source, comparing it with a desired reference voltage value, and adjusting the reference voltage source in response to the result of the comparison step;

wherein the step of determining the value of the internal reference voltage comprises replacing the output signal from the internal reference voltage source to the ADC by an external reference voltage signal, and determining the value of the internal reference voltage from the ADC output signal values generated in response to the internal and external reference voltages, respectively.

5. A method for calibrating a digital temperature sensor circuit, the circuit comprising an analogue temperature sensing means, an internal reference voltage source and an analogue-to-digital converter (ADC) arranged to receive respective signals from the analogue temperature sensing means and the reference voltage source and output a digital signal indicative of the ambient temperature, the method comprising the steps of determining the value of the internal reference voltage outputted by the reference voltage source, comparing it with a desired reference voltage value, and adjusting the reference voltage source in response to the result of the comparison step;

wherein the step of determining the value of the internal reference voltage comprises replacing the analogue temperature sensing means output signal by a known external voltage, and determining the internal reference voltage value using the ADC output signal generated in response thereto.

* * * * *